(12) United States Patent
Cho

(10) Patent No.: US 9,229,816 B2
(45) Date of Patent: *Jan. 5, 2016

(54) HYBRID SYSTEM ARCHITECTURE FOR RANDOM ACCESS MEMORY

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 370 days.

This patent is subject to a terminal disclaimer.

(21) Appl. No.: 13/047,230

(22) Filed: Mar. 14, 2011

(65) Prior Publication Data

US 2012/0239856 A1 Sep. 20, 2012

(51) Int. Cl.
*G06F 12/00* (2006.01)
*G06F 11/14* (2006.01)
*G06F 3/06* (2006.01)
*G06F 11/20* (2006.01)

(52) U.S. Cl.
CPC ............ *G06F 11/1441* (2013.01); *G06F 3/061* (2013.01); *G06F 3/0658* (2013.01); *G06F 3/0685* (2013.01); *G06F 11/2094* (2013.01); *G06F 3/0689* (2013.01); *G06F 11/1446* (2013.01); *G06F 11/2015* (2013.01)

(58) Field of Classification Search
None
See application file for complete search history.

(56) References Cited

U.S. PATENT DOCUMENTS

| | | | |
|---|---|---|---|
| 8,250,283 B1 * | 8/2012 | Lee et al. ...................... | 711/100 |
| 2002/0124139 A1 * | 9/2002 | Baek et al. .................... | 711/114 |
| 2004/0037120 A1 * | 2/2004 | Uysal et al. ................... | 365/200 |
| 2004/0177218 A1 * | 9/2004 | Meehan et al. ............... | 711/114 |
| 2004/0177219 A1 * | 9/2004 | Meehan et al. ............... | 711/114 |
| 2005/0027919 A1 * | 2/2005 | Aruga ............................ | 710/316 |
| 2005/0182898 A1 * | 8/2005 | Davis et al. ................... | 711/114 |
| 2006/0004957 A1 * | 1/2006 | Hand et al. .................... | 711/113 |
| 2006/0031422 A1 * | 2/2006 | Totolos, Jr. ................... | 709/219 |
| 2006/0161823 A1 * | 7/2006 | Sato ............................... | 714/710 |
| 2006/0288131 A1 * | 12/2006 | Lee ................................ | 710/29 |
| 2007/0022241 A1 * | 1/2007 | Sinclair ......................... | 711/100 |
| 2008/0141059 A1 * | 6/2008 | Kim et al. ..................... | 713/400 |
| 2009/0063895 A1 * | 3/2009 | Smith ............................. | 714/7 |
| 2009/0157958 A1 * | 6/2009 | Maroney et al. .............. | 711/114 |
| 2010/0008175 A1 * | 1/2010 | Sweere et al. ................ | 365/229 |
| 2010/0017649 A1 * | 1/2010 | Wu et al. ........................ | 714/6 |
| 2010/0049914 A1 * | 2/2010 | Goodwin ...................... | 711/114 |
| 2010/0073860 A1 * | 3/2010 | Moriai et al. ............ | 361/679.32 |
| 2010/0115321 A1 * | 5/2010 | Fujimoto et al. ............. | 713/340 |
| 2010/0241799 A1 * | 9/2010 | Schuette ........................ | 711/104 |
| 2010/0274965 A1 * | 10/2010 | Cleveland et al. ............ | 711/114 |
| 2011/0035548 A1 * | 2/2011 | Kimmel et al. ............... | 711/114 |
| 2011/0246716 A1 * | 10/2011 | Frame et al. .................. | 711/114 |

\* cited by examiner

*Primary Examiner* — Kaushikkumar Patel
(74) *Attorney, Agent, or Firm* — Saliwanchik, Lloyd & Eisenschenk

(57) ABSTRACT

Provided is a hybrid RAID controller coupled to a system control board. Coupled to the hybrid RAID controller are a DDR RAID controller, a RAM RAID controller, and a HDD/Flash RAID controller. A DDR RAID control block is coupled to the DDR RAID controller and includes (among other things) a set of DDR memory disks. Further, a RAM control block is coupled to the RAM RAID controller and includes a set of RAM SSDs. Still yet, a HDD RAID control block is coupled to the HDD/Flash RAID controller and includes a set of HDD/Flash SSD Units.

8 Claims, 4 Drawing Sheets ively utilized.

HYBRID SYSTEM ARCHITECTURE FOR RANDOM ACCESS MEMORY

CROSS-REFERENCE TO RELATED APPLICATION

This application is related in some aspects to commonly-owned, co-pending application Ser. No. 12/758,937, entitled SEMICONDUCTOR STORAGE DEVICE", filed on Apr. 13, 2010, the entire contents of which are herein incorporated by reference. This application is related in some aspects to commonly-owned, co-pending application Ser. No. 12/777,315, entitled HYBRID STORAGE SYSTEM FOR A MULTI-LEVEL RAID ARCHITECTURE", filed on Apr. 13, 2010, the entire contents of which are herein incorporated by reference.

FIELD OF THE INVENTION

The present invention relates to a hybrid system architecture for random access memory (RAM) such as Parameter RAM (PRAM), Magnetoresistive RAM (MRAM) and/or Ferroelectric RAM (FRAM).

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

Embodiments of the present invention provide a hybrid system architecture random access memory (RAM) such as Phase-Change RAM (PRAM), Magnetoresistive RAM (MRAM) and/or Ferroelectric RAM (FRAM). Specifically, embodiments of this invention provide a hybrid RAID controller coupled to a system control board. Coupled to the hybrid RAID controller are a DRAM RAID controller, a RAM RAID controller, and a HDD/Flash RAID controller. A DRAM RAID control block is coupled to the DRAM RAID controller, and includes (among other things) a set of DRAM memory disks. Further, a RAM control block is coupled to the RAM RAID controller and includes a set of RAM SSDs. Still yet, a HDD RAID control block is coupled to the HDD/Flash RAID controller and includes a set of HDD/Flash SSD Units.

A first aspect of the present invention provides a hybrid storage system for a multi-level RAID architecture, comprising: a hybrid RAID controller coupled to a system control board; a DDR RAID controller coupled to the hybrid RAID controller; a set of DDR RAID control blocks coupled to the DDR RAID controller, each of the set of DDR RAID control blocks comprising a set of DDR memory disks; a HDD RAID controller coupled to the hybrid RAID controller; and a set of HDD RAID control blocks coupled to the HDD RAID controller, each of the set of HDD RAID control blocks comprising a set of HDD/Flash SSD Units.

A second aspect of the present invention provides a hybrid storage system for a multi-level RAID architecture, comprising: a hybrid RAID controller coupled to a system control board; a DDR RAID controller coupled to the hybrid RAID controller; a set of DDR RAID control blocks coupled to the DDR RAID controller, each of the set of DDR RAID control blocks comprising a set of DDR memory disks and a PCI-Express RAID controller; a HDD RAID controller coupled to the hybrid RAID controller; and a set of HDD RAID control blocks coupled to the HDD RAID controller, each of the set of HDD RAID control blocks comprising a set of HDD/Flash SSD Units, and a PCI-Express RAID controller.

A third aspect of the present invention provides a method for providing a hybrid storage system for a multi-level RAID architecture, comprising: coupling a hybrid RAID controller to a system control board; coupling a DDR RAID controller to the hybrid RAID controller; coupling a set of DDR RAID control blocks to the DDR RAID controller, each of the set of DDR RAID control blocks comprising a set of DDR memory disks; coupling a HDD RAID controller to the hybrid RAID controller; and coupling a set of HDD RAID control blocks to the HDD RAID controller, each of the set of HDD RAID control blocks comprising a set of HDD/Flash SSD Units.

A fourth aspect of the present invention provides a hybrid storage system architecture for heterogeneous storage media comprising: at least one data processor chip; at least two types of at least one RAID controller coupled to the hybrid RAID controller; at least one storage media coupled to the corresponding type of at least one RAID controller.

A fifth aspect of the present invention provides a hybrid storage system architecture for heterogeneous storage media comprising: at least one hybrid RAID controller coupled to at least one system control board; at least two types of at least one RAID controller coupled to the hybrid RAID controller; at least one storage media coupled to the corresponding type of at least one RAID controller.

A sixth aspect of the present invention provides a hybrid storage system architecture for heterogeneous storage media comprising: at least one hybrid RAID controller coupled to at least one system control board; at least two types of at least one RAID controller coupled to the hybrid RAID controller; at least one storage media coupled to the corresponding type of at least one RAID controller; at least one sub RAID controller coupled to at least one of RAID controller; at least one storage media coupled to at least one sub RAID controller.

BRIEF DESCRIPTION OF THE DRAWINGS

These and other features of this invention will be more readily understood from the following detailed description of the various aspects of the invention taken in conjunction with the accompanying drawings in which.

Figure 1:
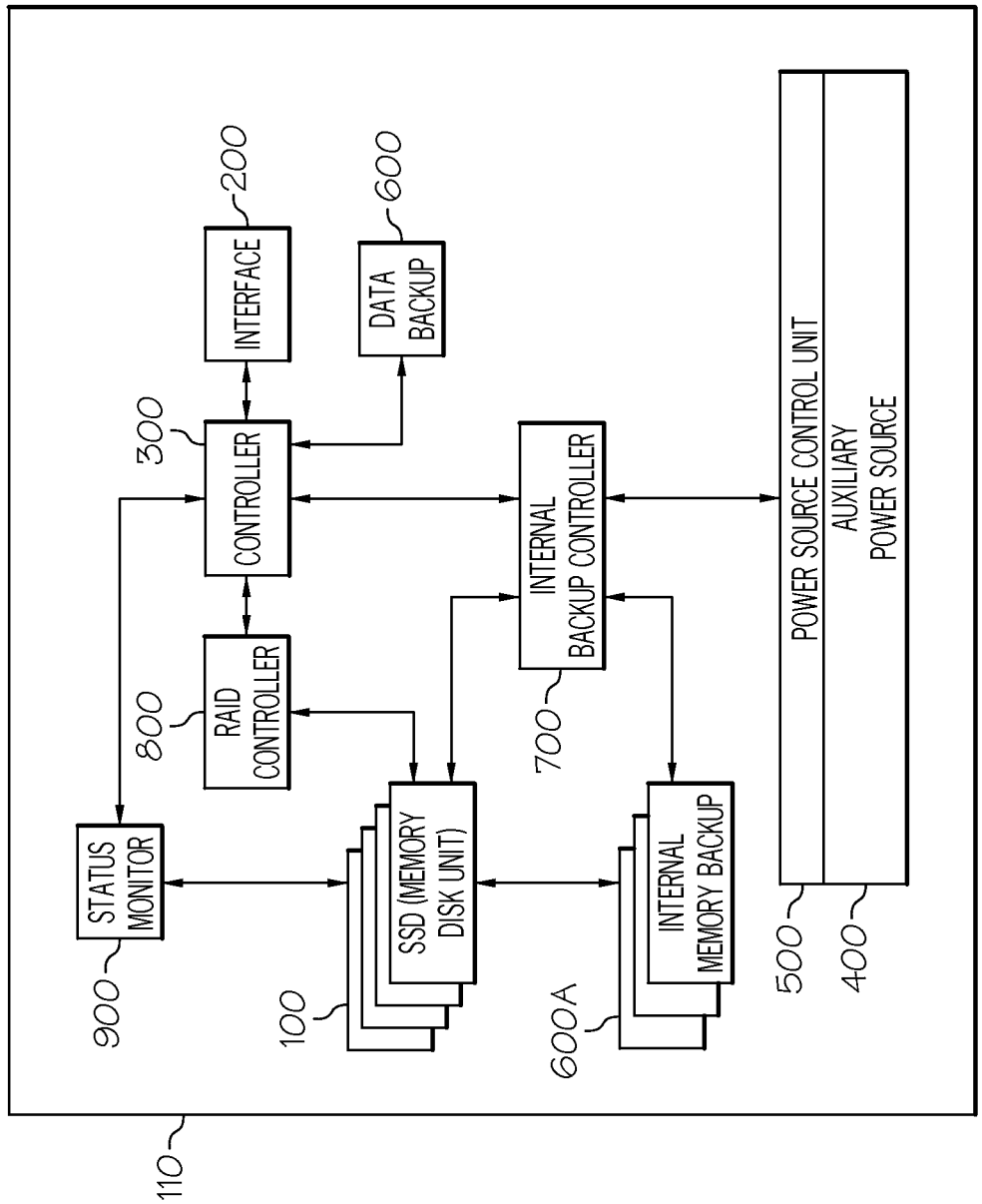
FIG. 1 is a diagram schematically illustrating a configuration of a RAID controlled storage device of a PCI-Express (PCI-e) type according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will now be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc. do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance. The term SSD means semiconductor storage device. The term DDR means double data rate. Still yet, the term HDD means hard disk drive.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of an I/O standard such as a serial attached small computer system interface (SAS)/serial advanced technology attachment (SATA) type according to an embodiment will be described in detail with reference to the accompanying drawings.

As indicated above, embodiments of the present invention provide a hybrid system architecture random access memory (RAM) such as Phase-Change RAM (PRAM), Magnetoresistive RAM (MRAM) and/or Ferroelectric RAM (FRAM). Specifically, embodiments of this invention provide a hybrid RAID controller coupled to a system control board. Coupled to the hybrid RAID controller are a DDR RAID controller, a RAM RAID controller, and a HDD/Flash RAID controller. A DDR RAID control block is coupled to the DDR RAID controller and includes (among other things) a set of DDR memory disks. Further, a RAM control block is coupled to the RAM RAID controller and includes a set of RAM SSDs. Still yet, a HDD RAID control block is coupled to the HDD/Flash RAID controller and includes a set of HDD/Flash SSD Units.

The storage device of a serial attached small computer system interface/serial advanced technology attachment (PCI-Express) type supports a low-speed data processing speed for a host by adjusting synchronization of a data signal transmitted/received between the host and a memory disk during data communications between the host and the memory disk through a periphery interface standard such as PCI-Express, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Referring now to FIG. 1, a diagram schematically illustrating a configuration of a PCI-Express type, RAID controlled semiconductor storage device (e.g., for providing storage for a serially attached computer device) according to an embodiment of the invention is shown. As depicted, FIG. 1 shows a RAID controlled PCI-Express type storage device 110 according to an embodiment of the invention which includes a SSD memory disk unit 100 (referred to herein as SSD memory disk unit, SSD, and/or SSD memory disk unit) comprising: a plurality of memory disks having a plurality of volatile semiconductor memories/memory units (also referred to herein as high-speed SSD memory disk units 100); a RAID controller 800 coupled to SSD memory disk units 100; an interface unit 200 (e.g., PCI-Express host) which interfaces between the SSD memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit 300, the SSD memory disk units 100, the backup storage unit, and the backup control unit which, when the power transferred from the host through the PCI-Express host interface unit is blocked or an error occurs in the power transferred from the host, receives power from the auxiliary power source unit and supplies the power to the SSD memory disk unit through the controller unit; a backup storage unit 600A-B that stores data of the SSD memory disk unit; and a backup control unit 700 that backs up data stored in the SSD memory disk unit in the backup storage unit, according to an instruction from the host or when an error occurs in the power transmitted from the host; and a redundant array of independent disks (RAID) controller 800 coupled to SSD memory disk unit 100, controller 300, and internal backup controller 700.

The SSD memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The SSD memory disk unit 100 may have a configuration in which the memory disks are arrayed in parallel.

The PCI-Express host interface unit 200 interfaces between a host and the SSD memory disk unit 100. The host may be a computer system or the like, which is provided with a PCI-Express interface and a power source supply device.

The controller unit 300 adjusts synchronization of data signals transmitted/received between the PCI-Express host interface unit 200 and the SSD memory disk unit 100 to control a data transmission/reception speed between the PCI-Express host interface unit 200 and the SSD memory disk unit 100.

As depicted, a PCI-e type RAID controller 800 can be directly coupled to any quantity of SSD memory disk units 100. Among other things, this allows for optimum control of SSD memory disk units 100. Among other things, the use of a RAID controller 800:

1. Supports the current backup/restore operations.
2. Provides additional and improved backup function by performing the following:
   a) the internal backup controller 700 determines the backup (user's request order or the status monitor detects power supply problems);
   b) the internal backup controller 700 requests a data backup to SSD memory disk units;
   c) the internal backup controller 700 requests internal backup device to backup data immediately;
   d) the internal backup controller 700 monitors the status of the backup for the SSD memory disk units and internal backup controller; and
   e) the internal backup controller 700 reports the internal backup controller's status and end-op.
3. Provides additional and improved restore function by performing the following:
   a) the internal backup controller 700 determines the restore (user's request order or the status monitor detects power supply problems);
   b) the internal backup controller 700 requests a data restore to the SSD memory disk units;
   c) the internal backup controller 700 requests an internal backup device to restore data immediately;
   d) the internal backup controller 700 monitors the status of the restore for the SSD memory disk units and internal backup controller; and
   e) the internal backup controller 700 reports the internal backup controller status and end-op.

Figure 2:
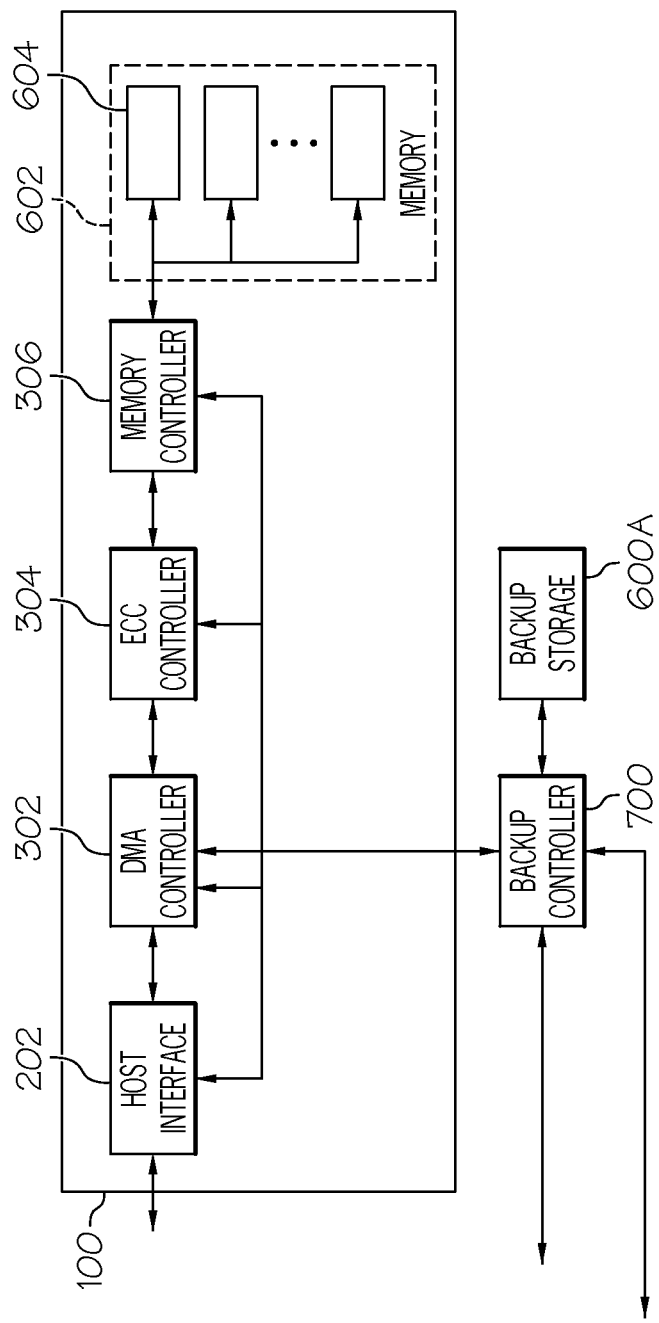
FIG. 2 is a more specific diagram of a RAID controller coupled to a set of SSDs.

Referring now to FIG. 2, a diagram schematically illustrating a configuration of the high-speed SSD 100 is shown. As depicted, SSD memory disk unit 100 comprises: a host interface 202 (e.g., PCI-Express host) (which can be interface 200 of FIG. 1, or a separate interface as shown); a Direct Memory Access (DMA) controller 302 interfacing with a backup control module 700; an ECC controller 304; and a memory controller 306 for controlling one or more blocks 604 of memory 602 that are used as high-speed storage. Also shown are backup controller 700 coupled to DMA controller and backup storage unit 600A coupled to backup controller 700.

In general, DMA is a feature of modern computers and microprocessors that allows certain hardware subsystems within the computer to access system memory for reading and/or writing independently of the central processing unit. Many hardware systems use DMA including disk drive controllers, graphics cards, network cards, and sound cards. DMA is also used for intra-chip data transfer in multi-core processors, especially in multiprocessor system-on-chips, where its processing element is equipped with a local memory (often called scratchpad memory) and DMA is used for transferring data between the local memory and the main memory. Computers that have DMA channels can transfer data to and from devices with much less CPU overhead than computers without a DMA channel. Similarly, a processing element inside a multi-core processor can transfer data to and from its local memory without occupying its processor time and allowing computation and data transfer concurrency.

Without DMA, using programmed input/output (PIO) mode for communication with peripheral devices, or load/store instructions in the case of multi-core chips, the CPU is typically fully occupied for the entire duration of the read or write operation, and is thus unavailable to perform other work. With DMA, the CPU would initiate the transfer, do other operations while the transfer is in progress, and receive an interrupt from the DMA controller once the operation has been done. This is especially useful in real-time computing applications where not stalling behind concurrent operations is critical.

Figure 3:
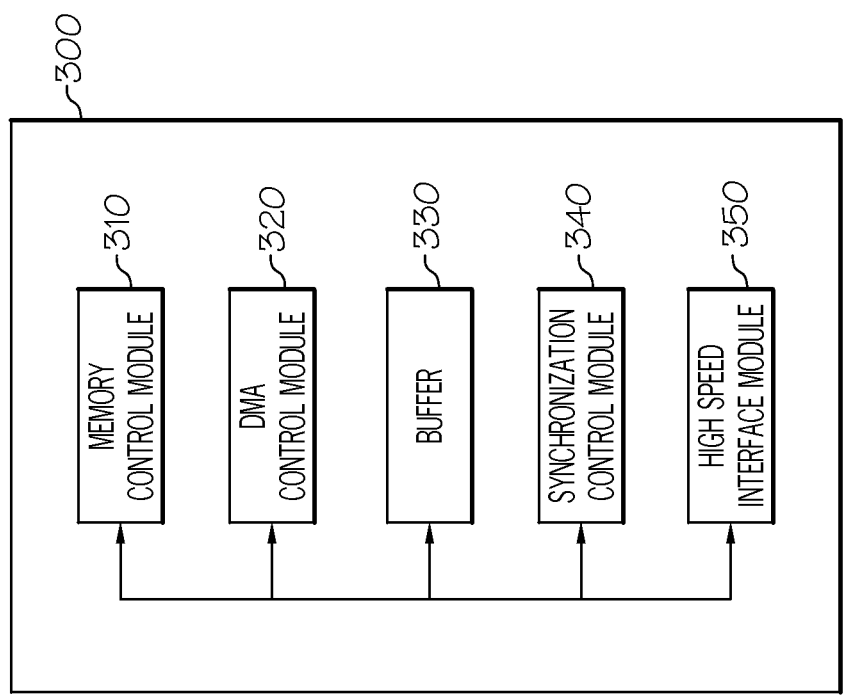
FIG. 3 is a diagram schematically illustrating a configuration of the high-speed SSD of FIG. 1.

Referring now to FIG. 3, the controller unit 300 of FIG. 1 is shown as comprising: a memory control module 310 which controls data input/output of the SSD memory disk unit 100; a DMA control module 320 which controls the memory control module 310 to store the data in the SSD memory disk unit 100, or reads data from the SSD memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the SSD memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the SSD memory disk unit 100 to transmit the synchronized data signal to the SSD memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data and adjusting data clocks Referring now to FIG. 4, a hybrid system architecture for RAM storage to an embodiment of the present invention is shown. It is understood in advance, this architecture could implemented for any type of RAM, examples include PRAM, MRAM, and/or FRAM. In general, these memories function as follows:

1. PRAM (Phase-change memory (also known as PCME, PRAM, PCRAM, Ovonic Unified Memory, Chalcogenide RAM and C-RAM)): PRAM is a type of non-volatile computer memory. PRAMs exploits the unique behavior of chalcogenide glass. With the application of heat produced by the passage of an electric current, this material can be "switched" between two states
2. MRAM (Magnetoresitive RAM): Non-volatile Memory. MRAM data is not stored as electric charge or current flows, but by magnetic storage elements.
3. FRAM (Ferroelectric RAM (FeRAM or FRAM)): FRAM is a random access memory similar in construction to DRAM but uses a ferroelectric layer instead of a dielectric layer to achieve non-volatility As depicted, the architecture includes a hybrid RAID controller 802 coupled to a system control board 810. Coupled to the hybrid RAID controller 802 is data backup unit 808, a DDR RAID controller 824, a RAM RAID controller 829 and a HDD/Flash RAID controller 826. A data backup unit 828 and a set (at least one) of DDR RAID control blocks 830 are coupled to DDR RAID controller 824. As shown, each DDR RAID control block 830 comprises: a set of DDR memory disks 832; a hot spare disk 834 coupled to the set of DDR memory disks; a (PCI-E to PCI-E) RAID controller 840 coupled to the set of DDR memory disks 832; a RAID fail component 836 coupled to the RAID controller 840; and a data backup component 838 coupled to the RAID controller 840.

Coupled to the RAM RAID controller 829 is a set (at least one) of RAM control block 860. Each of RAM control block 860 comprises: a set of RAM SSD Units 862; a hot spare disk 864 coupled to the set of RAM SSD Units 862; a RAID controller 866 coupled to the set of RAM SSD Units 862; and a RAID fail component 868 coupled to the RAID controller 866 and the hot spare disk 864.

Coupled to the HDD/Flash RAID controller 826 are a set (at least one) of HDD RAID control blocks. Each of the set of HDD RAID control blocks 842 comprises: a set of HDD/Flash SSD Units 844; a hot spare disk 846 couples to the set of HDD/Flash SSD Units 844; a (PCI-E) RAID controller 850 coupled to the set of HDD/Flash SSD Units 844; and a RAID fail component 848 coupled to the RAID controller 850.

Figure 4:
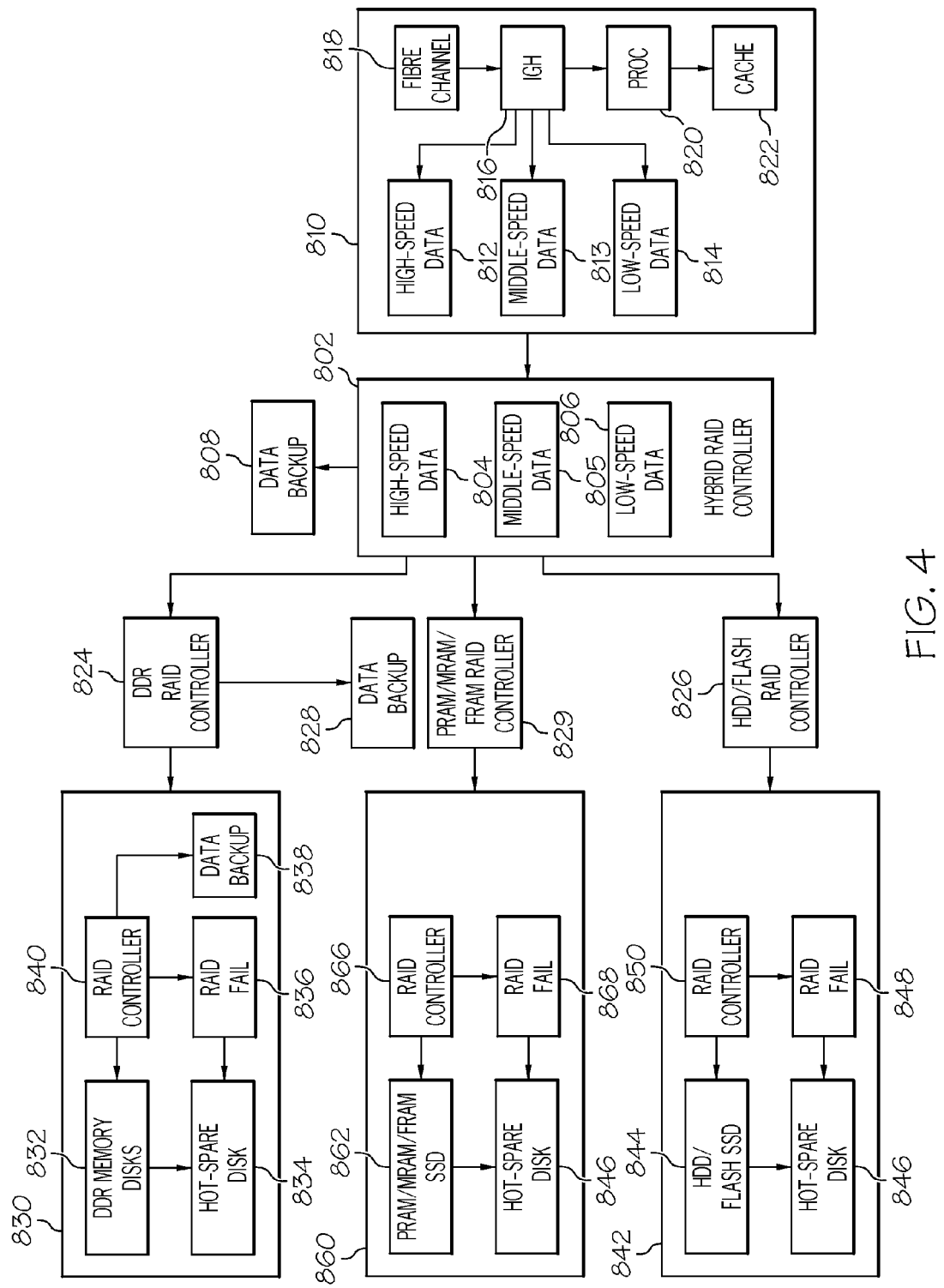
FIG. 4 is a diagram schematically illustrating the hybrid storage system for a multi-level RAID architecture according to an embodiment of the present invention.

As further shown in FIG. 4, hybrid RAID controller 802 comprises: a high-speed data controller 804; a middle-speed data controller 805, and a low-speed data controller 806. A data backup component 808 is shown coupled to hybrid RAID controller 802. System control board 810 generally comprises: a chip (e.g., IGH) 816; a high-speed data controller 812 coupled to the chip 816; a middle speed data controller 813 coupled to the chip 816, a low-speed data controller 814 coupled to the chip 816; a fibre channel chip 818 coupled to the chip 816; a processor 820 coupled to the chip 816; and cache memory 822 coupled to the processor 820.

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the SSD memory disk unit 100, the backup storage unit 600A-B, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the SSD memory disk unit 100 through the controller unit 300.

The backup storage unit 600A-B is configured as a low-speed non-volatile storage device such as a hard disk and stores data of the SSD memory disk unit 100.

The backup control unit 700 backs up data stored in the SSD memory disk unit 100 in the backup storage unit 600A-B by controlling the data input/output of the backup storage unit 600A-B and backs up the data stored in the SSD memory disk unit 100 in the backup storage unit 600A-B according to an instruction from the host, or when an error occurs in the power source of the host due to a deviation of the power transmitted from the host deviates from the threshold value.

The storage device of a serial-attached small computer system interface/serial advanced technology attachment (PCI-Express) type supports a low-speed data processing speed for a host by adjusting synchronization of a data signal transmitted/received between the host and a memory disk during data communications between the host and the memory disk through a periphery interface standard such as PCI-Express, and simultaneously supports a high-speed data processing speed for the memory disk, thereby supporting the performance of the memory to enable high-speed data processing in an existing interface environment at the maximum.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A hybrid system architecture for random access memory (RAM), comprising:
   a hybrid RAID controller coupled to a system control board;
   a DDR RAID controller coupled to the hybrid RAID controller;
   a first data backup component coupled to the DDR RAID controller;
   a set of DDR RAID control blocks internally coupled to the DDR RAID controller, each of the set of DDR RAID control blocks comprising a set of DDR memory disks;
   a RAM RAID controller coupled to the hybrid RAID controller;
   a set of RAM RAID control blocks internally coupled to the RAM RAID controller, each of the set of RAM control blocks comprising a set of RAM SSD units;
   a HDD RAID controller coupled to the hybrid RAID controller; and
   a set of HDD RAID control blocks internally coupled to the HDD RAID controller, each of the set of HDD RAID control blocks comprising a set of HDD/Flash SSD Units;
   wherein each of the set of DDR RAID control blocks further comprises:
     a hot spare disk coupled to the set of DDR memory disks;
     a RAID controller coupled to the set of DDR memory disks;
     a RAID fail component coupled to the RAID controller; and
     a second data backup component coupled to the RAID controller;

wherein the hybrid RAID controller comprises:
  a first high-speed data controller; and
  a first low-speed data controller; and
wherein the system control board comprises:
  a chip;
  a second high-speed data controller coupled to the chip;
  a second low-speed data controller coupled to the chip;
  a fibre channel chip coupled to the chip;
  a processor coupled to the chip; and
  cache memory coupled to the processor.

2. The hybrid system architecture of claim 1, each of the set of RAM RAID control blocks further comprising:
  a hot spare disk coupled to the set of DDR memory disks;
  a RAID controller coupled to the set of DDR memory disks; and
  a RAID fail component coupled to the RAID controller.

3. The hybrid system architecture of claim 1, each of the set of HDD RAID control blocks comprising:
  a hot spare disk coupled to the set of HDD/Flash SSD Units;
  a RAID controller coupled to the set of HDD/Flash SSD Units; and
  a RAID fail component coupled to the RAID controller.

4. The hybrid system architecture of claim 3, the RAID controller comprising a PCI-Express RAID controller.

5. A hybrid storage system for a multi-level RAID architecture, comprising:
  a hybrid RAID controller coupled to a system control board;
  a DDR RAID controller coupled to the hybrid RAID controller;
  a first data backup component coupled to the DDR RAID controller;
  a set of DDR RAID control blocks internally coupled to the DDR RAID controller, each of the set of DDR RAID control blocks comprising a set of DDR memory disks and a PCI-Express RAID controller;
  a RAM RAID controller coupled to the hybrid RAID controller;
  a set of RAM RAID control blocks internally coupled to the RAM RAID controller, each of the set of RAM RAID control blocks comprising a set of RAM SSD units and a PCI-Express RAID controller;
  a HDD RAID controller coupled to the hybrid RAID controller; and
  a set of HDD RAID control blocks internally coupled to the HDD RAID controller, each of the set of HDD RAID control blocks comprising a set of HDD/Flash SSD Units, and a PCI-Express RAID controller;
wherein each of the set of DDR RAID control blocks further comprises:
  a hot spare disk coupled to the set of DDR memory disks; and
  a second data backup component coupled to the RAID controller;
wherein the hybrid RAID controller comprises:
  a first high-speed data controller; and
  a first low-speed data controller; and
wherein the system control board comprises:
  a chip;
  a second high-speed data controller coupled to the chip;
  a second low-speed data controller coupled to the chip;
  a fibre channel chip coupled to the chip;
  a processor coupled to the chip; and
  cache memory coupled to the processor.

6. The hybrid storage system of claim 5, each of the set of RAM RAID control blocks further comprising:
  a hot spare disk coupled to the set of DDR memory disks;
  a RAID controller coupled to the set of DDR memory disks; and
  a RAID fail component coupled to the RAID controller.

7. The hybrid storage system of claim 5, each of the set of HDD RAID control blocks comprising:
  a hot spare disk coupled to the set of HDD/Flash SSD Units; and
  a RAID fail component coupled to the RAID controller.

8. A method for providing hybrid storage system for a multi-level RAID architecture, comprising:
  coupling a hybrid RAID controller to a system control board;
  coupling a DDR RAID controller to the hybrid RAID controller;
  coupling a first data backup component to the DDR RAID controller;
  coupling a set of DDR RAID control blocks internally to the DDR RAID controller, each of the set of DDR RAID control blocks comprising a set of DDR memory disks;
  coupling a RAM RAID controller to the hybrid RAID controller;
  coupling a set of RAM RAID control blocks internally to the RAM RAID controller, each of the set of RAM RAID control blocks comprising a set of RAM SSD units;
  coupling an HDD RAID controller to the hybrid RAID controller; and
  coupling a set of HDD RAID control blocks internally to the HDD RAID controller, each of the set of HDD RAID control blocks comprising a set of HDD/Flash SSD Units;
wherein each of the set of DDR RAID control blocks further comprises:
  a hot spare disk coupled to the set of DDR memory disks;
  a PCI-Express RAID controller coupled to the set of DDR memory disks;
  a RAID fail component coupled to the RAID controller; and
  a second data backup component coupled to the RAID controller;
wherein the hybrid RAID controller comprises:
  a first high-speed data controller; and
  a first low-speed data controller; and
wherein the system control board comprises:
  a chip;
  a second high-speed data controller coupled to the chip;
  a second low-speed data controller coupled to the chip;
  a fibre channel chip coupled to the chip; a processor coupled to the chip; and
  cache memory coupled to the processor.

* * * * *